2 Sheets--Sheet 1.

S. F. GOLD.

Apparatus for Heating Buildings by Steam.

No. 4,744.

Reissued Feb. 6, 1872.

Inventor.
Samuel F. Gold
By Thos P. Hove
Atty

Witnesses.
Arnold Hartmann
William A. Donnelly

S. F. GOLD.

Apparatus for Heating Buildings by Steam.

No. 4,744. Reissued Feb. 6, 1872.

Inventor. Samuel F. Gold
By Thos. D. Cover
Atty

Witnesses: Arnold Hoermann
William A. Donnelly

UNITED STATES PATENT OFFICE.

SAMUEL F. GOLD, OF ENGLEWOOD, NEW JERSEY, ASSIGNOR, BY MESNE ASSIGNMENTS, TO THE UNION STEAM AND WATER HEATING COMPANY.

IMPROVEMENT IN APPARATUS FOR HEATING BUILDINGS BY STEAM.

Specification forming part of Letters Patent No. 24,456, dated June 21, 1859; reissue No. 4,744, dated February 6, 1872.

SPECIFICATION.

I, SAMUEL F. GOLD, formerly of Cornwall, in the county of Litchfield and State of Connecticut, but now of Englewood, Bergen county, New Jersey, have invented certain Improvements in Apparatus for Heating Buildings, of which the following is a specification:

*Nature and Objects of the Invention.*

The first general division of my invention relates to the construction of the generator or boiler, and is designed to secure economy of construction, durability, facility of operation, safety, and other advantages which will be hereinafter set forth. The second general division of my invention relates to the construction, arrangement, and combination with a steam-generator or boiler of the supplementary steam-chambers or radiators, hereinafter described, for radiating the heat derived from the steam furnished by the generator into the air to be warmed, as hereinafter more fully set forth.

*Description of the Accompanying Drawing.*

Figure 1:
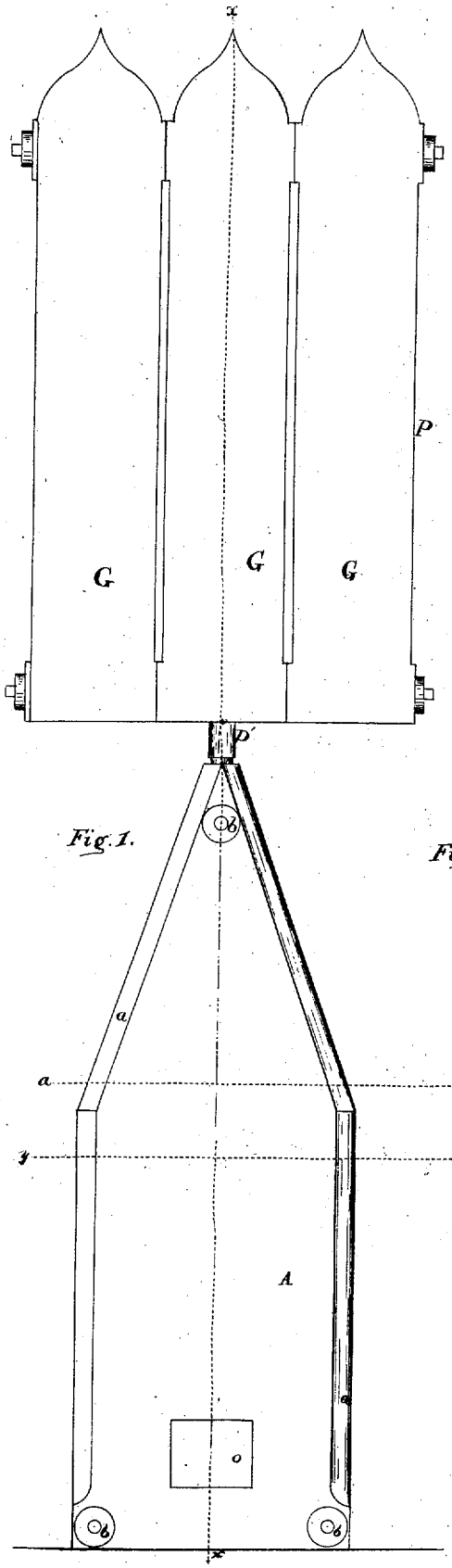
Figure 2:
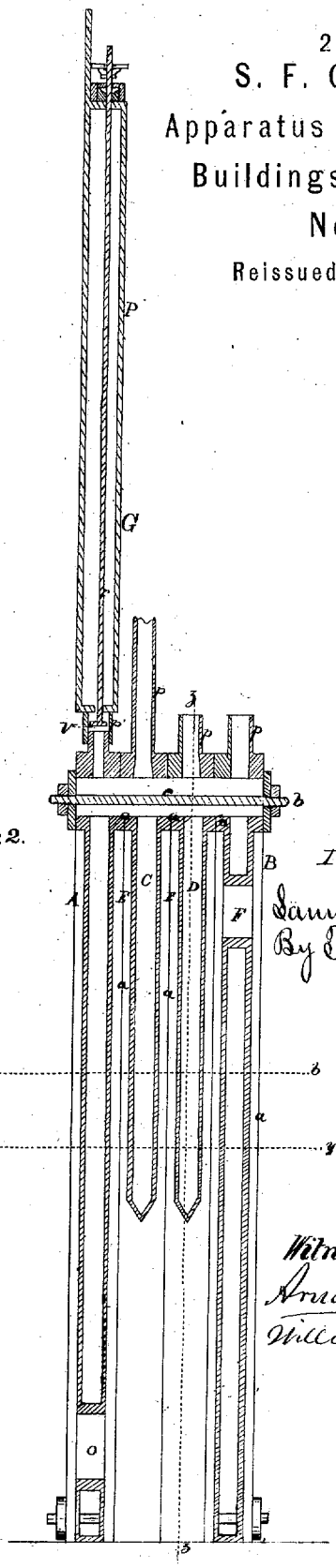
Figure 3:
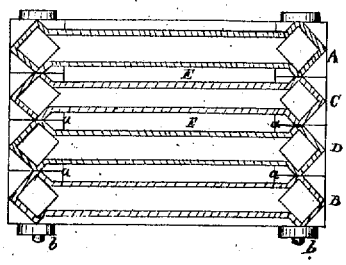
Figure 4:
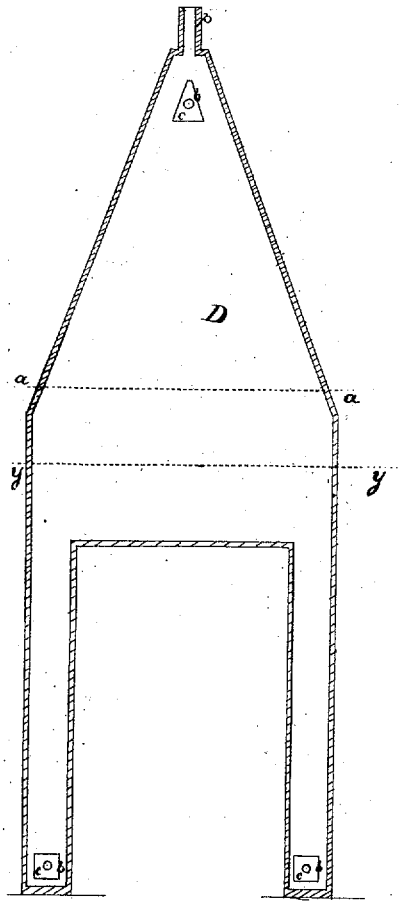
Figure 5:
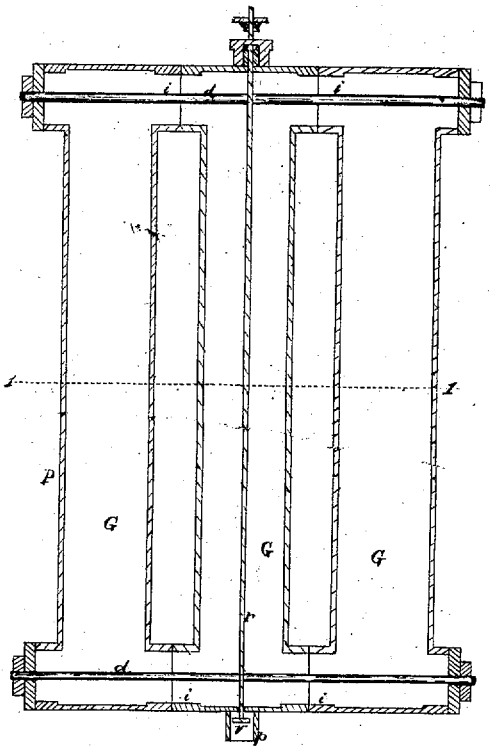
Figure 6:
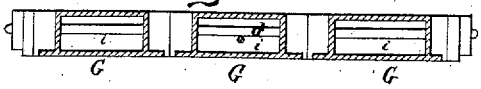

Figure 1 is a front elevation of the generator and one of the steam-chambers or radiators of the apparatus. Fig. 2 is a vertical section of the generator, and one of the supplementary steam-chambers or radiators of the apparatus, showing the parts which lie at the left-hand of the line *x x*, drawn across Fig. 1. Fig. 3 is a horizontal section of the generator, showing the parts which lie below the line *y y*, drawn across Figs. 1, 2, and 4. Fig. 4 is a vertical section of one of the intermediate or inside sections of the generator, showing the parts upon one side of the line *z z*. Fig. 5 is a vertical section of one of the supplementary steam-chambers or radiators on a plane parallel to the plane of Fig. 1. Fig. 6 is a horizontal section of one of the supplementary steam-chambers or radiators, showing the parts below the line 1 1, drawn across Figs. 1, 2, and 5.

*General Description.*

In constructing the generator or boiler, I make it up of a series of cast-metal sections, each section being cast in a single piece and so constructed as to be a complete generator of itself, and the sections being so connected as to communicate with each other, and each section is provided with a pipe for the discharge of steam which is to be allowed to pass into one or more of the supplementary steam-chambers or radiators.

In the drawing, the generator is represented as being made up of four sections, A, B, C, and D; A and B being the front and back or exterior sections; and C and D being the interior or intermediate sections. The front section A is provided with a fire-door or opening, O, for fuel, and the rear section B is provided with an exit opening, F, for the discharge of the products of combustion. These sections are all of cast metal of a single piece formed by casting on cores, and may be of the forms represented in the drawing. The internal sections C D are precisely alike with the possible exception of the length of pipe for discharging the steam therefrom. The flat faces of the sections facing the other sections are surrounded by a raised rim extending to the bottom of the water leg, as seen at *a*, so that when the sections are placed in position a series of chambers, E, are formed between the water and steam space of one section and the water and steam space of the next section. This series of sectional generators constitutes a single generator when united by the screw-bolts *b*, the sections communicating with each other at the top and bottom by large openings *e*, through which these bolts *b* extend. The capacity of the generator thus constructed is regulated to adapt it to the size of the building to be warmed, and other circumstances of the case, by the insertion of the proper number of intermediate sections, each of which adds water and steam-space, and heating surface complete in itself, and gives an additional chamber, E. These chambers E being directly over the fire receive the heat rising therefrom, and being out of the draught, the full effect of the caloric is imparted to the sectional generators. In this construction the heat rises into a series of chambers without outlet, instead of being carried by a current through flues. Each section of the generator is provided at the top with a pipe, *p*, to receive the supplementary steam-chamber or radiator which is to be placed upon it.

In the construction of the generator, by making it up of a series of sections, as described, the disadvantage heretofore experienced in the construction of cast-iron boilers is overcome. The great difficulty involved in the constructions adopted previous to my invention has been found in the danger of rupture arising from unequal expansion of the inner and outer surfaces. This is altogether obviated by the construction here described, since there is comparatively but little exterior surface to the generator; and that being in intimate contact with what may be termed the internal surface, it is heated to nearly the same degree. This is altogether owing to the sectional construction by which the generator is made up, as in enlarging the capacity of the generator additional internal sections are inserted, the whole surface of which, with the exception of a narrow edge, is internal surface. The chambers E, which are of the character of a *cul-de-sac*, extend upward above the water-line *a b* to the top of the steam-space, and this heats the entire surface of the top of each section. Herein these chambers differ essentially from any other character of generator. The sectional character of the generator, besides its adaptability to the end in view, is particularly advantageous from the facility it gives for constructing generators of various capacities, the ease with which any portion may be repaired, and the facility of changing a generator of small capacity into one of larger. It is moreover cheaper of construction than any generator in use previous to my invention. P is one of the supplementary steam-chambers or radiators designed to radiate the necessary heat for warming the building into the air to be warmed. This radiator P is made up of any number of sections, G, which may be required, three being the number shown, though additional sections may be interposed between the outside sections and the middle section, if necessary, for the work to be performed. These sections G are each cast entire in a single piece upon cores in the same way as the sections of the generator, and have projecting openings at the top and bottom, as shown, to form communication between the sections, and to separate them from each other so as to leave space between them for the circulation of the air to be warmed, and to form channels therefor. The sides and edges, or in other words, both the broadest and narrowest sides of these sections are made flat for the purposes of giving a greater amount of radiating surface in proportion to the space occupied by the section, and the internal capacity thereof, and aiding a proximate surface in more perfectly heating the air, which purposes these flattened surfaces accomplish more perfectly than they are accomplished by the cylindrical surfaces of round iron pipes.

It will be observed that the air-channels formed between the edges or narrowest sides of the sections G of the radiator P, are rectangular—that is to say, the flattened surfaces of the narrowest sides of these sections face each other and give a direct radiation toward each other—which has a tendency to throw the heat into or at least toward the middle of the current, as the column of air ascends in the channel formed between the sections. The sections G are united to form the chamber P by bolts *d*, extending through openings *i*, as shown in Fig. 5, and securing any desired number of the sections together. One of the sections G of the chamber P, has a short pipe, *p'*, extending downward from an opening into it to connect it to one of the pipes *p* of the generator, and form a communication between the chamber P and one of the sections of the generator, for the upward passage of the steam to supply the radiator, and the return to the generator of the water of condensation formed in the chamber P by the radiation of heat therefrom. A simple valve, V, with a rod, *r*, operated from the outside, shown in Figs. 2 and 5, serve to close the communication between the generator and the supplementary steam-chambers, when desired.

The manner of arranging these supplementary steam-chambers or radiators P above the generator, will depend on the locality and the circumstances of each individual case. Thus, for example, it will be seen by an inspection of Fig. 2 of the drawing, that three of the pipes *p* extending upward from the generator, are all quite short, and two of them of the same length and the third one nearly so, which will bring the radiators P, when placed thereon, down near the generator, as shown in Figs. 1 and 2, and alongside of each other, while the other of these pipes *p* is represented as being extended upward an indefinite length—or, in other words, extended up higher than the three short ones above mentioned—and broken off, which would necessarily bring the radiator to be placed upon it into a higher position than that occupied by the radiator, shown in Figs. 1 and 2.

The broad flattened sides of the radiators P are excellent and direct radiators of heat, and when placed side by side, in accordance with the provision for the reception of most of them shown in the drawing as above stated, they form large additions to the air channels formed between the sections G of each radiator, as above described, and the flat surfaces in like manner radiating directly toward each other, operate as heretofore stated, to throw the heat into the middle of the channel so formed.

I make no claim to horizontal cylindrical boilers coupled together as in use previous to my application for the original patent. Neither do I claim water legs below the main water-chamber of steam-boilers, as such differ from my invention. Nor do I claim the formation of vertical flues in boilers.

*Claims.*

I claim as my invention—

1. A steam generator or boiler composed of a series of cast-metal sections each complete in itself, said internal sections being constructed substantially as described, to form the sides and top of the fire-chamber or combustion-chamber, and said end sections being constructed, substantially as described, to form the ends thereof, and the sections united substantially as hereinbefore set forth, by which construction the capacity of the generator and furnace is made capable of being increased or diminished by the addition or removal of internal sections.

2. Constructing the sections of the generator with raised rims *a* upon the edges thereof, by which construction the chambers E, rising above the water-line and out of the draught, are formed when the sections are united together.

3. The steam-chamber or radiator P, made up of cast-metal sections, or sectional chambers G, substantially as hereinbefore set forth.

4. The combination of one or more of the radiators P, composed of cast-metal sections or sectional chambers G, with a steam-generator, substantially as hereinbefore set forth.

5. The flat steam-chamber G adapted to the radiation of heat, and cast in a single piece, substantially as hereinbefore set forth.

SAMUEL F. GOLD.

Witnesses:
WM. DONELLY,
THOS. P. HOW.